United States Patent [19]
Kim

[11] Patent Number: 5,467,334
[45] Date of Patent: Nov. 14, 1995

[54] DISK PLAYER MECHANISM

[75] Inventor: Ko-hyun Kim, Suwon, Rep. of Korea

[73] Assignee: Samsung Electronics Co., Ltd., Kyungki, Rep. of Korea

[21] Appl. No.: 103,713

[22] Filed: Aug. 10, 1993

[30] Foreign Application Priority Data

| Aug. 10, 1992 | [KR] | Rep. of Korea | 92-14353 |
| Aug. 12, 1992 | [KR] | Rep. of Korea | 92-14471 |
| Aug. 12, 1992 | [KR] | Rep. of Korea | 92-15097 |

[51] Int. Cl.⁶ .......................... G11B 33/02; G11B 25/04
[52] U.S. Cl. ........................... 369/77.1; 369/75.2
[58] Field of Search .................. 369/77.1, 75.2, 369/270, 77.2, 75.1; 360/99.02, 99.06

[56] References Cited

U.S. PATENT DOCUMENTS

| 4,628,498 | 12/1986 | Takamatsu et al. | 369/77.1 |
| 5,010,437 | 4/1991 | Utsugi et al. | 360/137 |
| 5,022,023 | 6/1991 | Toxoguchi | 369/77.1 |
| 5,031,171 | 7/1991 | Kurumada et al. | 369/77.1 |
| 5,084,855 | 1/1992 | Kobayashi et al. | 369/77.1 |
| 5,166,917 | 11/1992 | Decoster et al. | 369/77.1 |
| 5,226,028 | 7/1993 | Yamada et al. | 369/77.1 |

*Primary Examiner*—Stuart S. Levy
*Assistant Examiner*—David L. Ometz
*Attorney, Agent, or Firm*—Sughrue, Mion, Zinn, Macpeak & Seas

[57] ABSTRACT

A disk player mechanism includes a slider slidably installed by a driving device on one side of a chassis, a selective driving device for selectively connecting or separating from the slider and driving device, an attaching/detaching device for connecting or detaching a guide roller from the slider-driving device so as to selectively rotate or stop the guide roller, and an engaging device being engaged with a clamp according to the movement of the slider for clamping or releasing the disk. Blocking plates swing up to close a disk-inserting slot, to prevent more than one disk from being inserted at a given time.

18 Claims, 5 Drawing Sheets

DISK PLAYER MECHANISM

BACKGROUND OF THE INVENTION

1. Field of the Invention

The present invention relates to a disk player mechanism, and particularly to a disk player mechanism which facilitates operation and prevents the insertion of more than one disk and damage to the writing surface thereof due to its contact with other components.

In an automotive CD player, usually, a disk is inserted or ejected by the driving of a guide roller installed on the front of the main body of the player. Then, after the disk is seated on a turntable, a clamp is operated to chuck or release the disk.

Referring to FIG. 1 showing a disk player as described above, a user usually inserts a disk 76 manually. Here, without being loaded on any carriage, disk 76 is inserted through an insertion slot 75 formed on the front of a player main body 78. However, in such a conventional mechanism, since the disk-inserting slot 75 is always open, disks may be dually inserted, which causes severe problems with the player. Furthermore, since the writing surface of disk 76 is in direct contact with guide roller 77 during insertion, the writing surface may be damaged.

SUMMARY OF THE INVENTION

Therefore, it is an object of the present invention to provide a disk player mechanism which facilitates the insertion or ejection of a disk and a clamping operation, and has a simplified structure.

To accomplish the object of the present invention, there is provided a disk player mechanism comprising: a chassis; a disk guide and a guide roller installed to oppose each other vertically in a disk-inserting slot in the front of the chassis; a roller-supporting plate pivotally supporting the guide roller; a clamp pivotally installed on the chassis for clamping or releasing a disk seated on a turntable; a slider slidably installed by slider driving means on one side of the chassis; selective driving means for selectively connecting or separating from the slider and slider driving means; attaching/detaching means for connecting or detaching the guide roller from the slider driving means according to the movement of the slider so as to selectively rotate or stop the guide roller; and engaging means engaged with the clamp according to the movement of the slider for clamping or releasing the disk, whereby when the slider is connected to the slider driving means to be driven by the selective driving means, the clamp is engaged with the slider to clamp or release the disk, and when the guide roller is connected to the slider driving means to be driven by the attaching/detaching means, the disk is loaded or ejected.

In features of the present invention, during the disk insertion, the guide roller is connected to the slider driving means by the attaching/detaching means, and the guide roller is rotated by the power for sliding the slider. Here, the slider is separated from the slider-driving means by the selective driving means, and thus stops. Therefore, the disk is loaded into the player by the rotation of the guide roller. When the disk is completely loaded, the slider is connected to the slider driving means by the selective driving means and slides. At the same time, the clamp is engaged with the slider by the engaging means, so as to clamp or release the disk.

BRIEF DESCRIPTION OF THE DRAWINGS

The above object and other advantages of the present invention will become more apparent by describing in detail a preferred embodiment thereof with reference to the attached drawings, in which.

DETAILED DESCRIPTION OF THE INVENTION

Figure 1:
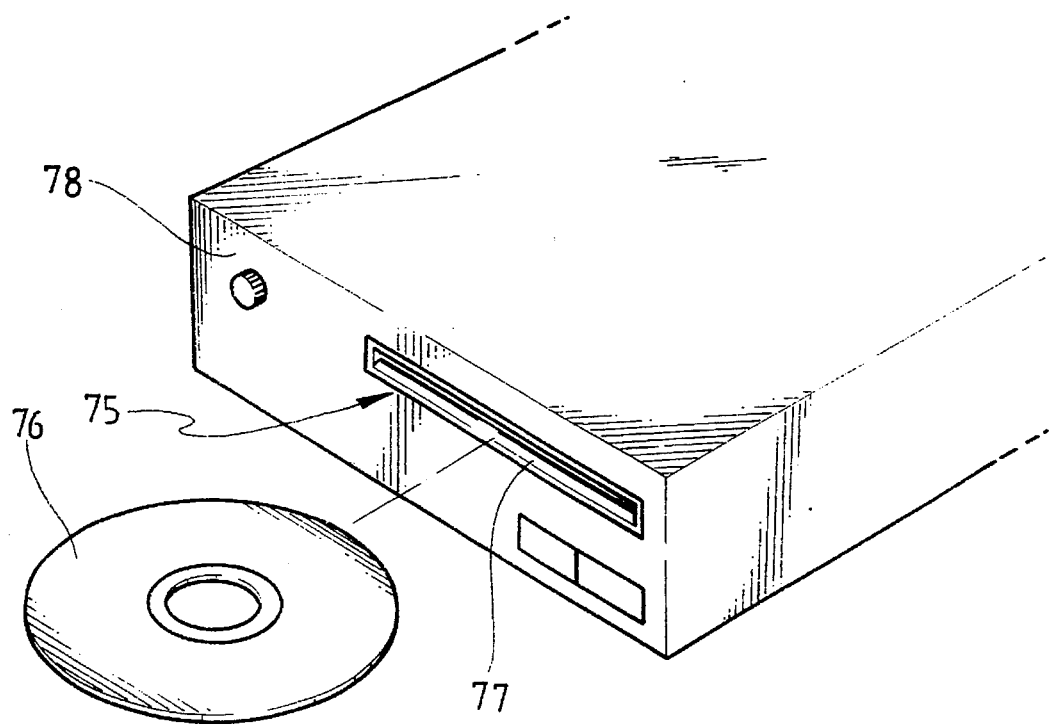
FIG. 1 is a partially perspective view of a disk player.
Figure 2:
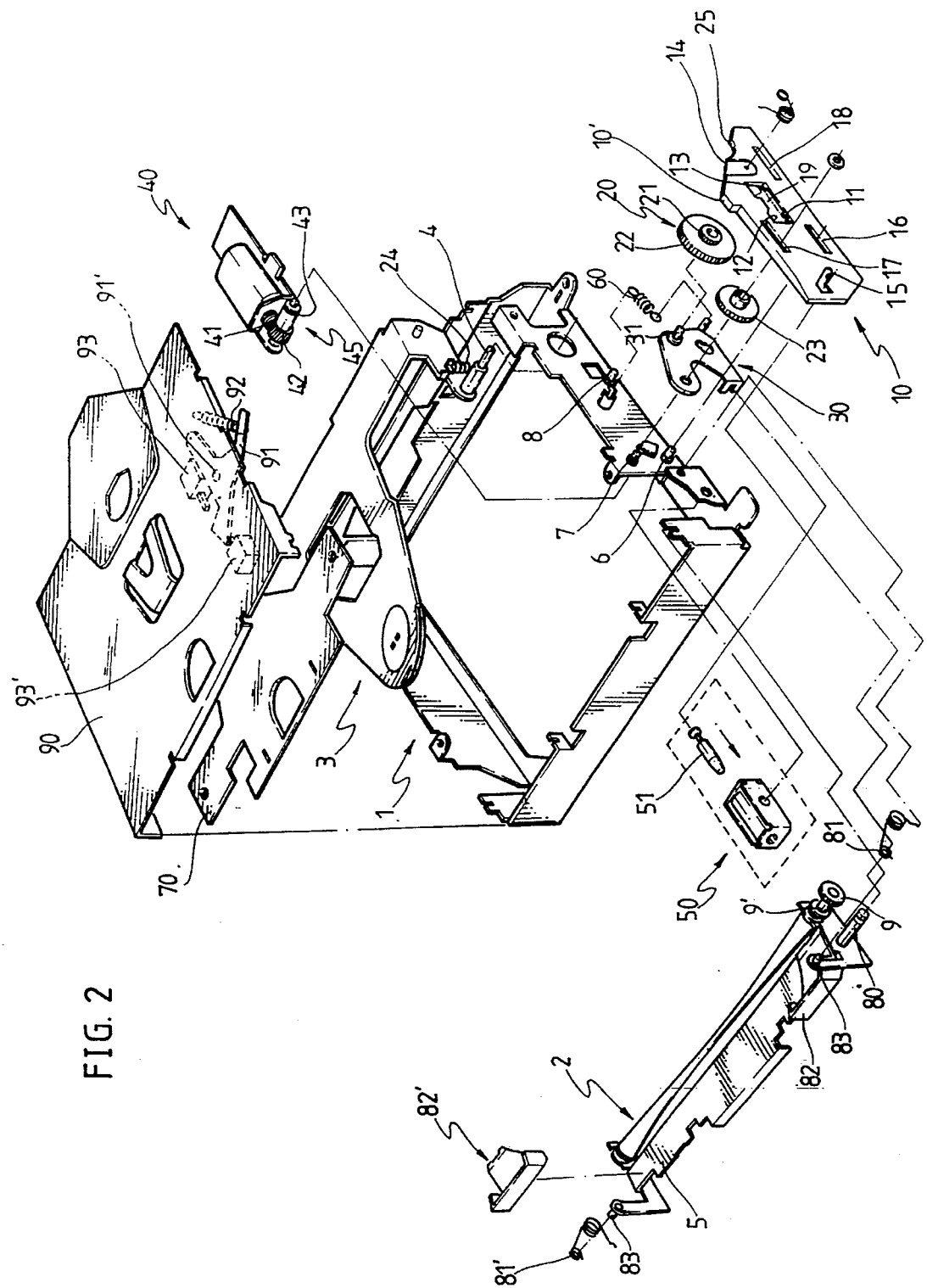
FIG. 2 is an exploded perspective view of a disk player mechanism according to the present invention.

Referring to FIG. 2, reference numeral 1 denotes a chassis for supporting the components of the disk player of the present invention. Various components, such as an optical pickup (not shown) for reading or recording information by projecting a light beam onto a disk, a turntable (not shown) on which the disk is seated, and the like, are assembled onto chassis 1.

A roller-supporting plate 5 installed with a guide roller 2 is coupled to the front of the chassis 1 corresponding to a disk insertion slot of the player. Roller-supporting plate 5 is pivotally engaged with chassis 1 by hinges 83 and 83'. A following gear 9 is provided at one end of shaft 9' of guide roller 2.

Guide roller 2 is made of rubber so as to prevent the sliding or damage of a disk while being in contact therewith. A disk guide 70 is assembled to chassis 1 above guide roller 2, so that the disk passes between guide roller 2 and disk guide 70 when entering the player.

Figure 7:
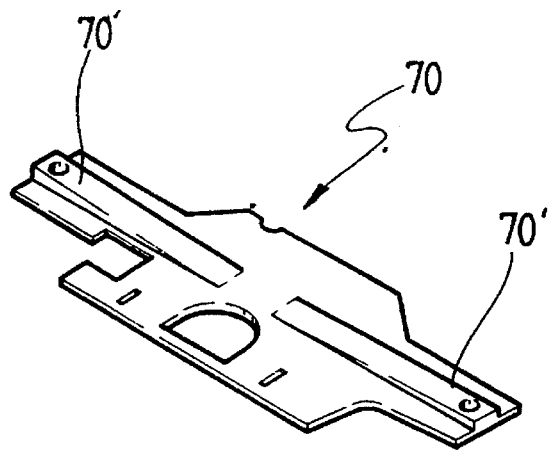
FIG. 7 is a perspective view of a disk guide of the disk player mechanism of the present invention.

Meanwhile, guide roller 2 is formed in such a shape that its sectional area increases gradually from its middle toward the ends thereof, so as to be somewhat hourglass-shaped. Referring briefly to FIG. 7 wherein the disk guide 70 is viewed from its bottom side, ramp portions 70' are formed on disk guide 70 so that the guide is, in effect, concave in its central portion. Due to this configuration, when the disk passes between guide roller 2 and disk guide 70, the central portion (writing surface) of the disk does not come into contact with guide roller 2 and disk guide 70.

Figure 3:
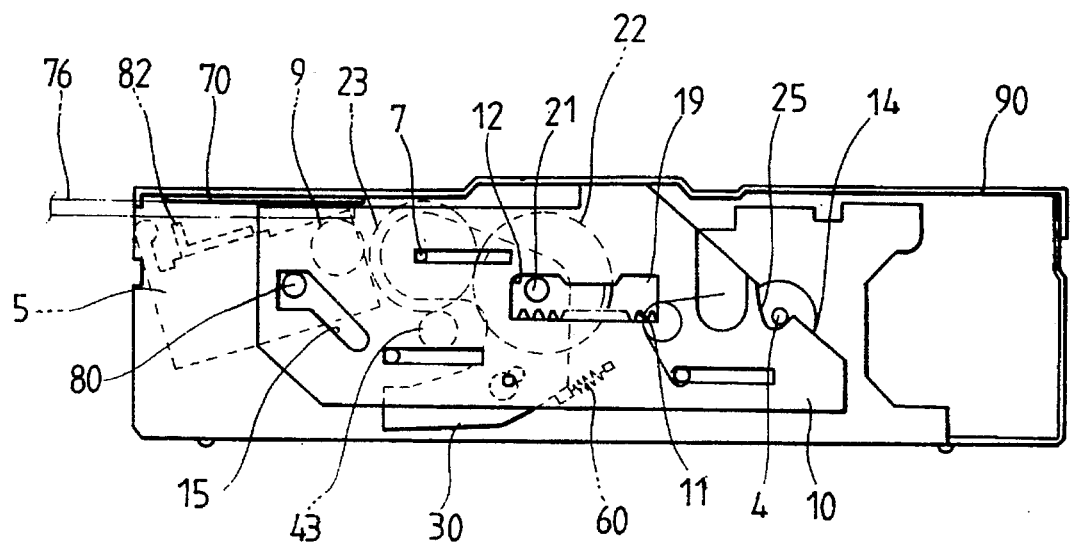
FIG. 3 is a schematic side view of the disk player mechanism of FIG. 2 to explain a disk-insertion operation.
Figure 5:
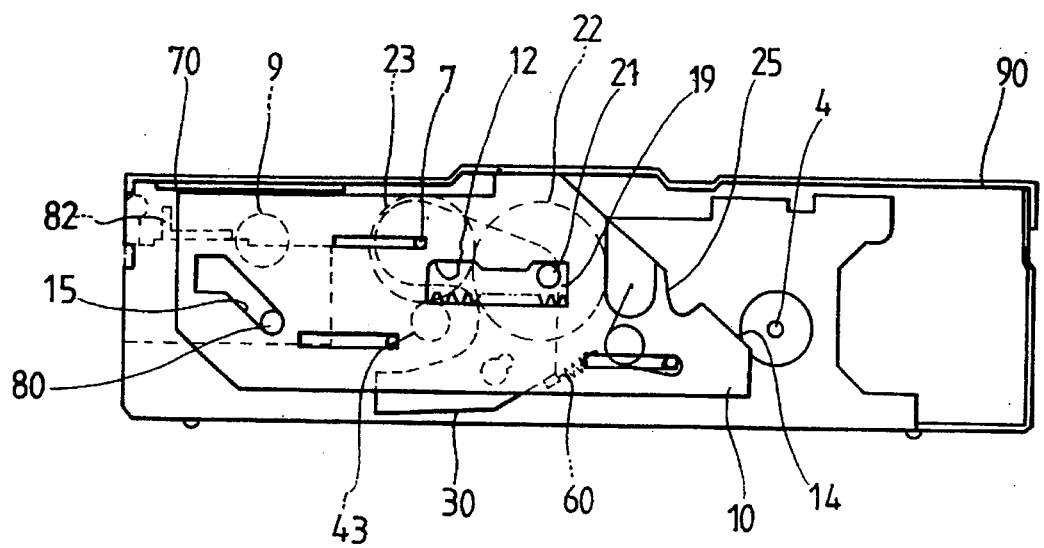
FIG. 5 is a schematic side view of the disk player mechanism of FIG. 2 to explain the state in which disk loading is completed.

Two blocking plates 82 and 82' are provided on roller-supporting plate 5. As shown in FIGS. 3 and 5, blocking plates 82 and 82' close or open part of the disk-inserting slot according to the pivoting of roller-supporting plate 5.

An elastically biasing device for butting guide roller 2 against disk guide 70 is provided on roller-supporting plate 5. The disk is inserted between guide roller 2 pushed toward disk guide 70 by the elastically biasing device and disk guide 70.

The elastically biasing device is constructed by connected hinges 83 and 83' of roller-supporting plate to chassis 1, using springs 81 and 81'. Thus, guide roller 2 is able to be in resilient contact with disk guide 70.

A clamp 3 is pivotally supported on the back portion of chassis 1. Clamp 3 moves to clamp or release the disk seated on a turntable (not shown). A lever 4 is provided on clamp 3 so as to protrude from chassis 1. Clamp 3 is engaged with a slider 10 by an engaging device, so as to pivot.

Slider 10 is provided on one side of chassis 1 to be slidable forward and backward by a driving device. Also, slider 10 is connected to or detached from the driving device for sliding the slider, by a selective driving device.

Figure 4:
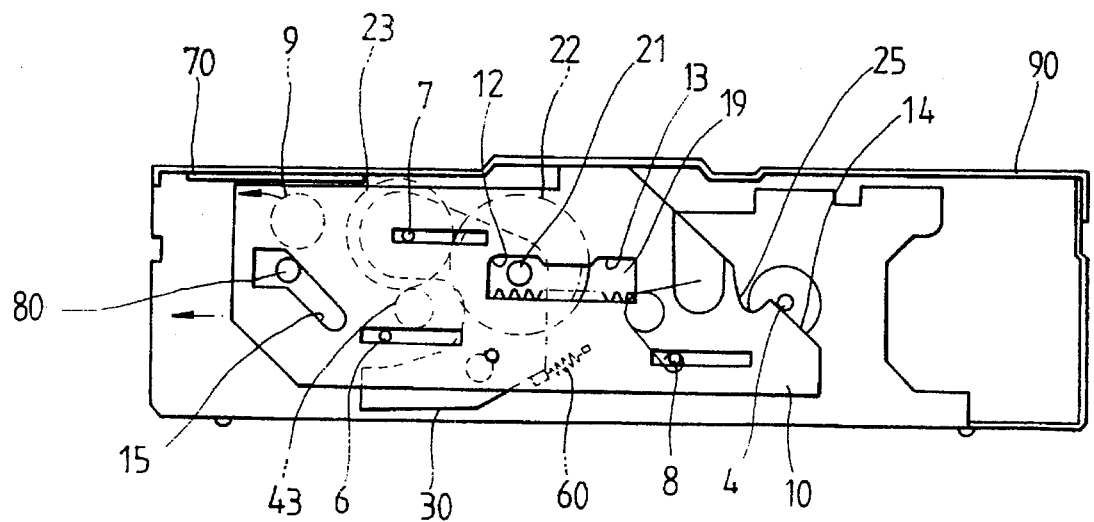
FIG. 4 is a schematic side view of the disk player mechanism of FIG. 2 to explain a disk-loading operation.

Here, as illustrated in FIGS. 2 and 4, the slider's driving device is constructed by installing a plurality of guide pins 6, 7, and 8 on one side of chassis 1, forming a main guide-slot 19 having a rack and a plurality of auxiliary guide-slots 16, 17, and 18 to which the respective guide pins 6, 7, and 8 are coupled, on slider 10, and installing a gear assembly 20 comprising a pinion 21 engaged with rack 11 and a driven gear 22 driven by a driving device between chassis 1 and the slider. Therefore, when driven gear 22 is rotated by the driving device, pinion 21 is rotated while being engaged with rack 11, and slider 10 is then slid from side to side.

In the selective driving device, a plurality of guide pins 6, 7, and 8 are formed on one side of chassis 1. Main guide-slot 19 having a rack 11 and a plurality of auxiliary guide-slots 16, 17 and 18 coupled to the respective guide pins 6, 7 and 8 are formed on slider 10. A gear assembly 20 having a pinion 21 engaged with rack 11 and a driven gear 22 driven by a driving device is provided between chassis 1 and slider 10. An operating plate 30 is installed on guide pin 7 to be rotated by a rotating device.

In the selective driving device, when the operating plate 30 is rotated by the rotating device, the pinion 21 is selectively engaged with or detached from rack 11. Meanwhile, separating grooves 12 and 13 are formed on either end of main guide-slot 19, so as to facilitate the above engagement or detachment of pinion 21.

As illustrated in FIG. 2, the driving device for driving driven gear 22 is constructed by installing a driving motor 40 inside chassis 1 and connecting driving motor 40 to driven gear 22 by a gear arrangement. The power of driving motor 40 is transmitted via the gear arrangement so that driven gear 22 is rotated.

In the gear arrangement, an idler gear 23 is rotatably installed around the guide pin 7, interposing operating plate 30, so as to be constantly engaged with driven gear 22. Further, a worm 41 is provided at the shaft of driving motor 40, and a dual gear 45 having a worm gear 42 engaged with worm 41 on one end and a connecting gear 43 engaged with idler gear 23 on the other end, is attached to chassis 1. As such, the power of driving motor 40 can be transmitted to driven gear 22 via the gear arrangement.

Guide roller 2 is connected to or detached from the slider-driving device by an attaching/detaching device. Thus, guide roller 2 is selectively rotated and stopped depending upon the operation of the attaching/detaching device.

The attaching/detaching device for connecting or detaching guide roller 2 and the slider-driving device is constructed by forming a slanted slot 15 on slider 10, installing a following gear 9 on one end of guide roller 2, and hingedly mounting roller-supporting plate 5, to which guide roller 2 is supported and a roller guide pin 80 is formed on one side, to chassis 1 by hinges 83 and 83'. Roller guide pin 80 is coupled to slanted slot 15.

As slider 10 is slid from side to side, guide roller 2 is moved from top to bottom so that following gear 9 is engaged with or detached from idler gear 23. Here, following gear 9 is coupled to one end of shaft 9' which is compressively inserted into guide roller 2 during assembly, so that guide roller 2 is rotated according to the rotation of following gear 9.

A rotating device for rotating operating plate 30 is constructed by connecting an operating rod 51 of a solenoid 50 operated by a switching device to one end of operating plate 30. As power is applied to solenoid 50, operating rod 51 reciprocates to rotate operating plate 30. Accordingly, pinion 21 is operated to be engaged with or detached from rack 11 of slider 10.

Meanwhile, one end of operating rod 51 of solenoid 50 operated by a switching device is connected to one side of operating plate 30, and the other side of operating plate 30 is connected to chassis 1 using spring 60. By doing this, the configuration may be such that during the operation of solenoid 50, operating plate 30 is rotated in one direction so that pinion 21 engages with rack 11 and when solenoid 50 is not operated, operating plate 30 is rotated in the opposite direction due to the elasticity of spring 60 so that pinion 21 is detached from rack 11.

As the switching device, micro switches 93 and 93' electrically connected to solenoid 50 are provided on a cover 90 installed above chassis 1. A switch lever 91 connected to the power source and one end of which is alternately connected to one of switches 93 and 93' and the other end of which is elastically installed to cover 90 via spring 92, is pivotally installed on the cover by a pivot 91'. A stop 10' for blocking the other end of switch lever 91 is formed on the upper edge of slider 10, so that switch lever 91 is engaged with stop 10' to be alternately connected with one of switches 93 and 93' according to the movement of slider 10. Thus, for example, when switch lever 91 is connected with switch 93', power is applied to solenoid 50, and when switch lever 91 is connected with switch 93, the power is interrupted.

A clamp engaging device for rotating clamp 3 is constructed by forming a sloped guiding edge 14 along one side of slider 10 on which lever 4 of clamp 3 is slid and connecting clamp 3 with chassis 1 by spring 24. A stopping groove 25 is formed on sloped guiding edge 14.

Therefore, lever 4 slides on sloped guiding edge 14 of slider 10 while in constant contact therewith. Here, when lever 4 of clamp 3 is not within the confines of stopping groove 25, clamp 3 clamps the disk. When lever 4 falls into stopping groove 25, clamp 3 is detached from the disk.

A description of the operation of the disk player mechanism of the present invention will be outlined below.

Referring to FIG. 3, first, slider 10 and the driving device for driving slider 10 are separated by the selective driving device, and guide roller 2 is connected to the slider-driving device by the attaching/detaching device so as to be rotated. When disk 76 is inserted between guide roller 2 (FIG. 2) and disk guide 70, the disk 76 is inserted by the frictional force with the rotation of guide roller 2.

Subsequently, referring to FIG. 4, when disk 76 is seated on a spindle motor (not shown), the slider-driving device and slider 10 are connected by the selective driving device, so that slider 10 slides to the left. Here, clamp 3 is rotated by the engaging device so as to clamp disk 76, as shown in FIG. 5. Then, referring to FIG. 6, the ejecting operation of the disk is carried out according to the reverse operation of the above.

Now, the operation of the disk player mechanism of the present invention will be described below.

Disk Insertion

Figure 8:
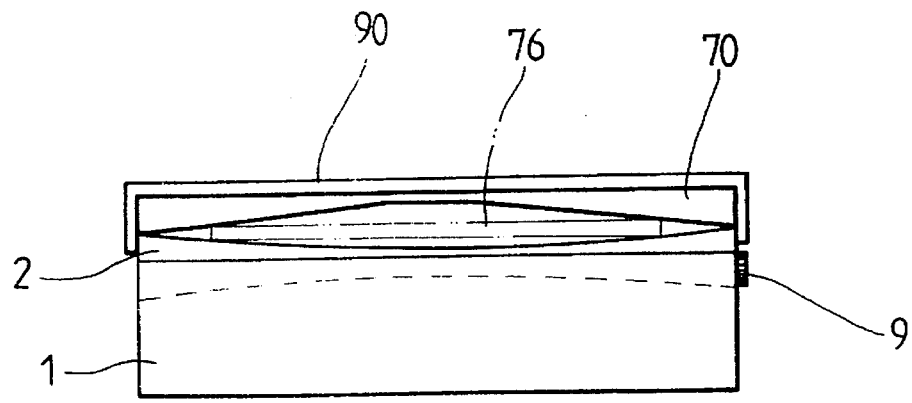
FIG. 8 is a schematic front view of a disk player mechanism of FIG. 2, in which a disk insertion slot is shown.

Referring to FIGS. 2, 3, and 8 first, when the player is not operated, slider 10 is conveyed toward the rear of chassis 1. By doing this, lever 4 of clamp 3 is located in the stopping groove 25 of slider 10, clamp 3 is in a released state from a turntable (not shown), and roller guide pin 80 of roller-supporting plate 5 is located in the upper section of slanted slot 15 of slider 10.

Since roller-supporting plate 5 is rotated counter-clockwise, blocking plates 82 and 82' are in a position such as to open the disk-inserting slot, and guide roller 2 is in elastic contact with disk guide 70 by means of springs 81 and 81'. Concurrently, solenoid 50 remains inactive, causing operating plate 30 to be held in the counter-clockwise position by spring 60. Therefore, pinion 21 is separated from rack 11 of main guide-slot 19.

Here, the space provided by separating groove 12 formed in main guide-slot 19 secures the separation of pinion 21 from rack 11. Following gear 9 assembled to the axis 9' of guide roller 2 is engaged with idler gear 23.

In this state, when disk 76 is inserted between guide roller 2 and disk guide 70, driving motor 40 is driven according to a sensor (not shown). Then, idler gear 23 connected to driving motor 40 by dual gear 45 is rotated, and following gear 9 engaged with the idler gear is rotated which in turn rotates guide roller 2. As a result, due to the rotation of guide roller 2, disk 76 is inserted so as to be seated on the unshown spindle motor.

Disk Clamping

Referring to FIGS. 2, 4, and 5, upon the seating of disk 76 onto the turntable, slider 10 is moved slightly to the left so as to make switch lever 91 detached from switch 93'. By doing this, when power is applied to solenoid 50 pushing operating rod 51 in the direction of the arrow (FIG. 2), operating plate 30 is rotated clockwise. Then, pinion 21 is engaged with rack 11. At the same time, referring to FIG. 4, pinion 21 driven by driving motor 40 is rotated clockwise to slidingly convey slider 10 to the left. Simultaneously, switch lever 91 is engaged with stop 10' of slider 10. As roller guide pin 80 of roller-supporting plate 5 descends along slanted slot 15, roller-supporting plate 5 rotates so that following gear 9 is detached from idler gear 23. Lever 4 of clamp 3 slides along sloped guiding edge 14 of slider 10 to make clamp 3 rotate counter-clockwise by the restoring force of spring 24. When lever 4 is detached from sloped guiding edge 14 of slider 10, clamp 3 clamps disk 76.

After the finishing of the disk clamping, as shown in FIG. 5, blocking plates 82 and 82' are so positioned such as to close the disk-inserting slot. When slider 10 is completely moved to the left, switch lever 91 abuts switch 93 to cut off the power supply to solenoid 50. At the same time, as shown in FIG. 5, operating plate 30 is rotated counter-clockwise by spring 60 so as to detach pinion 21 from rack 11. Here, the detaching of pinion 21 is guaranteed due to the space of separating groove 13 of main guide-slot 19. Then, slider 10 stops.

Disk Ejection

Figure 6:
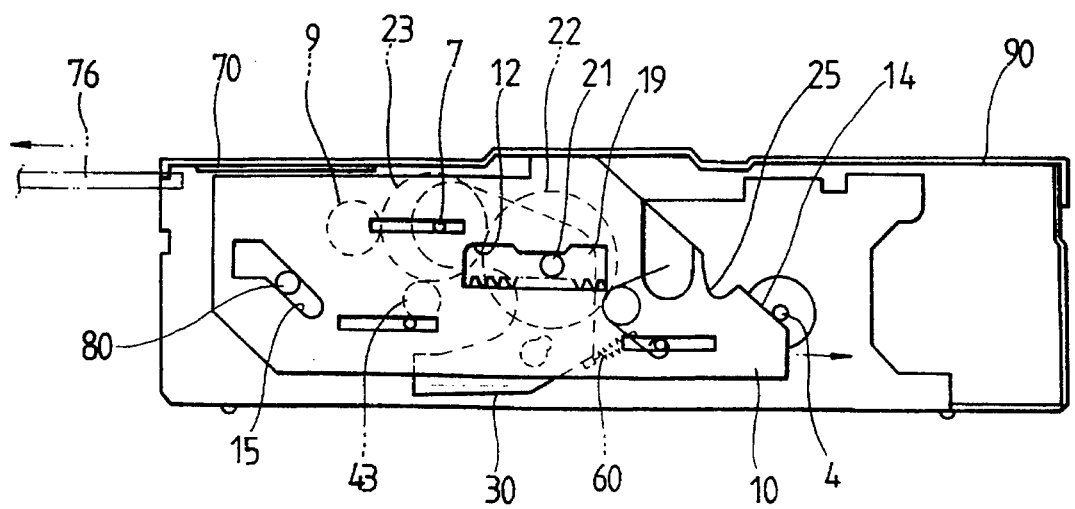
FIG. 6 is a schematic side view of the disk player mechanism of FIG. 2 to explain a disk-ejecting operation.

Referring to FIGS. 2 and 6, first, when an ejecting button (not shown) is pressed, slider 10 is moved slightly to the right so that switch lever 91 is detached from switch 93 so that power is applied to solenoid 50. When operating rod 51 is operated, operating plate 30 is rotated clockwise and pinion 21 is engaged with rack 11. Concurrently, pinion 21 driven by driving motor 40 is rotated counter-clockwise to move slider 10 to the right. At the same time, switch lever 91 is rotated by the restoring force of spring 92. As lever 4 of clamp 3 slides upward along sloped guiding edge 14, clamp 3 is lifted from the turntable so as to release the disk. Roller guide pin 80 is guided to the upper section of slanted slot 15, so that following gear 9 assembled with shaft 9' of guide roller 2 is rotated to approach idler gear 23.

When roller guide pin 80 of roller-supporting plate 5 is midway along slanted slot 15 formed in slider 10, following gear 9 is engaged with idler gear 23 to rotate guide roller 2, thereby discharging the disk. As slider 10 moves, switch lever 91 rotated by the restoring force of spring 92 is detached from switch 93', thereby cutting off the supply of power to solenoid 50. Operating plate 30 is rotated counter-clockwise by spring 60, and thus pinion 21 is separated from rack 11. By doing this, slider 10 stops. Roller guide pin 80 is located in the upper section of slanted slot 15. Therefore, blocking plates 82 and 82' are in a position such as to open the disk-inserting slot.

As described above, in the disk player mechanism of the present invention, a guide roller 2 for inserting and ejecting of the disk according to slider 10 and a clamp 3 for clamping and releasing the disk are selectively operated to thereby simplify the mechanism structure and secure the operation.

While the disk is located in the mechanism of the present invention, the disk-inserting slot is blocked by blocking plates 82 and 82' so as to prevent the insertion of more than one disk. Furthermore, when disk 76 is inserted into the disk-inserting slot, only the edge of the disk makes contact with disk guide 70 and guide roller 2, thereby protecting the writing surface of the disk.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A disk player mechanism comprising:

a chassis;

a disk guide and a guide roller installed to oppose each other vertically in a disk-inserting slot in the front of said chassis;

a roller-supporting plate pivotally supporting said guide roller;

a clamp pivotally installed on said chassis for selectively clamping and releasing a disk seated on a turntable;

a slider slidably installed by slider driving means on one side of said chassis;

selective driving means for selectively connecting and separating said slider and said slider driving means;

attaching/detaching means for selectively connecting and detaching said guide roller from said slider driving means according to the movement of said slider so as to selectively make said guide roller rotate or stop;

engaging means engaged with said clamp according to the movement of said slider for selectively clamping and releasing the disk;

wherein when said slider is connected to said slider driving means to be driven by said selective driving means, said clamp is engaged with said slider to selectively clamp and release the disk, and when said guide roller is connected to said slider driving means to be driven by said attaching/detaching means, the disk is loaded or ejected;

wherein said slider driving means comprises:

a plurality of guide pins on one side of said chassis;

a main guide-slot formed on said slider having a rack and a plurality of auxiliary guide-slots, to which said guide pins are coupled; and a gear assembly comprising a pinion engaged with said rack and a driven gear driven by a driving device between said chassis and slider, so that when said driven gear is rotated, said slider is then slid from side to side;

wherein a rotating device for rotating an operating plate comprises a solenoid operated by a switching device to one end of said operating plate, so that said operating plate rotates according to a state of the switching device;

wherein said switching device comprises:

a pair of switches electrically connected to said solenoid are provided on a cover installed above said chassis;

a switch lever, pivotally provided on said cover at a pivot point, connected to a power source and one end of which is slid across said pair of switches and the other end of which is elastically installed to said cover; and a stop for blocking the other end of said switch lever formed on the upper edge of said slider, wherein said switch lever is engaged with said stop according to the movement of said slider, so as to be alternately connected with one of said switches.

2. A disk player mechanism as claimed in claim 1, wherein said guide roller has a cross-section which increases gradually from the center to the ends, such that the central portion of one side of the disk does not come into contact with said guide roller.

3. A disk player mechanism as claimed in claim 2, further comprising elastically biasing means for creating pressing force on the disk inserted between said guide roller and disk guide.

4. A disk player mechanism as claimed in claim 3, wherein said elastically biasing means connects at least one side of said roller-supporting plate to said chassis by springs, so that said guide roller is in elastic contact with said disk guide.

5. A disk player mechanism as claimed in claim 1, further comprising elastically biasing means for creating pressing force on the disk inserted between said guide roller and said disk guide.

6. A disk player mechanism as claimed in claim 5, wherein said elastically biasing means connects at least one side of said roller-supporting plate to said chassis by springs, so that said guide roller is in elastic contact with said disk guide.

7. A disk player mechanism as claimed in claim 1, wherein ramp portions are formed on the bottom of said disk guide to create a concavity from either side thereof to its center, so that the central portion of one side of the disk does not come into contact with said disk guide.

8. A disk player mechanism as claimed in claim 1, wherein blocking plates are installed on said roller-supporting plate so as to close the disk-inserting slot according to the rotation of said roller-supporting plate.

9. A disk player mechanism as claimed in claim 1, wherein separating grooves opposite to said rack are formed in both ends of said main guide-slot.

10. A disk player mechanism as claimed in claim 1, wherein said driving device for driving said driven gear comprises:

a driving motor inside said chassis having said slider; and a gear arrangement connecting said driving motor to said driven gear, so that said driving motor rotates said driven gear.

11. A disk player mechanism as claimed in claim 10, wherein said gear arrangement comprises:

an idler gear installed on the rotating shaft of said operating plate so as to be constantly engaged with said driven gear;

a worm provided at the shaft of said driving motor; and a dual gear, provided on said chassis, having a worm gear engaged with said worm on one end and a connecting gear engaged with said idler gear on the other end.

12. A disk player mechanism as claimed in claim 1, wherein the other side of said operating plate is connected to said chassis using a spring so that during the operation of said solenoid, said operating plate is rotated in one direction to engage said pinion with said rack and when said solenoid is not operated, said operating plate is rotated in the opposite direction due to the elasticity of said spring thereby detaching said pinion from said rack.

13. A disk player mechanism as claimed in claim 1, wherein said engaging device comprises:

a sloped guiding edge having a stopping groove provided along one side of said slider; and a lever extended from said clamp, said lever being elastically installed onto said sloped guiding edge to closely slide thereon, wherein, as said slider moves forward and backward, said lever is engaged with said sloped guiding edge.

14. A disk player mechanism comprising:

a chassis;

a disk guide and a guide roller installed to oppose each other vertically in a disk-inserting slot in the front of said chassis;

a roller-supporting plate pivotally supporting said guide roller;

a clamp pivotally installed on said chassis for selectively clamping and releasing a disk seated on a turntable;

a slider slidably installed by slider driving means on one side of said chassis;

selective driving means for selectively connecting and separating said slider and said slider driving means;

attaching/detaching means for selectively connecting and detaching said guide roller from said slider driving means according to the movement of said slider so as to selectively make said guide roller rotate or stop; and engaging means engaged with said clamp according to the movement of said slider for selectively clamping and releasing the disk, wherein when said slider is connected to said slider driving means to be driven by said selective driving means, said clamp is engaged with said slider to selectively clamp and release the disk, and when said guide roller is connected to said slider driving means to be driven by said attaching/detaching means, the disk is loaded or ejected;

wherein said attaching/detaching means comprises a slanted slot being formed in said slider, a following gear being installed on one end of said guide roller, said roller-supporting plate on one side of which a roller guide pin is formed being pivotally installed to the main body of said chassis, and said roller guide pin being coupled to said slanted slot, so that said guide roller is moved up and down according to the sliding of said slider, to make said following gear be selectively connected to or detached from said slider-driving means, wherein said slider driving means comprises:

a plurality of guide pins on one side of said chassis;

a main guide-slot formed on said slider having a rack and a plurality of auxiliary guide-slots, to which said guide pins are coupled; and a gear assembly comprising a pinion engaged with said rack and a driven gear driven by a driving device between said chassis and slider, so that when said driven gear is rotated, said slider is then slid from side to side, wherein a rotating device for rotating an operating plate comprises a solenoid operated by a switching device to one end of said operating plate, so that said operating plate rotates according to a state of the switching device; and wherein said switching device comprises:

a pair of switches electrically connected to said solenoid provided on a cover installed above said chassis;

a switch lever, pivotally provided on said cover at a pivot point, connected to a power source and one end of which is slid across said pair of switches and the other end of which is elastically installed to said cover; and a stop for blocking the other end of said switch lever formed on the upper edge of said slider, wherein said switch lever is engaged with said stop according to the movement of said slider, so as to be alternately connected with one of said switches.

15. A disk player mechanism as claimed in claim 14, wherein separating grooves opposite to said rack are formed in both ends of said main guide-slot.

16. A disk player mechanism as claimed in claim 14, wherein said driving device for driving said driven gear comprises:

a driving motor inside said chassis having said slider; and a gear arrangement connecting said driving motor to said driven gear, so that said driving motor rotates said driven gear.

17. A disk player mechanism as claimed in claim 16, wherein said gear arrangement comprises:

an idler gear installed on the rotating shaft of said operating plate so as to be constantly engaged with said driven gear;

a worm provided at the shaft of said driving motor; and a dual gear, provided on said chassis, having a worm gear engaged with said worm on one end and a connecting gear engaged with said idler gear on the other end.

18. A disk player mechanism as claimed in claim 14, wherein the other side of said operating plate is connected to said chassis using a spring so that during the operation of said solenoid, said operating plate is rotated in one direction to engage said pinion with said rack and when said solenoid is not operated, said operating plate is rotated in the opposite direction due to the elasticity of said spring thereby detaching said pinion from said rack.

* * * * *